United States Patent [19]
Nakanose et al.

[11] Patent Number: 5,718,395
[45] Date of Patent: Feb. 17, 1998

[54] SPIRAL ELECTRODE ASSEMBLY MANUFACTURING APPARATUS

[75] Inventors: Takeharu Nakanose, Katano; Saburo Nakatsuka, Kyoto; Katsushi Matsuo, Neyagawa, all of Japan

[73] Assignee: Matsushita Electric Industrial Co., Ltd., Japan

[21] Appl. No.: 754,133

[22] Filed: Nov. 22, 1996

[30] Foreign Application Priority Data

Nov. 27, 1995 [JP] Japan .................................. 7-307671

[51] Int. Cl.⁶ .................................................. H01M 4/04
[52] U.S. Cl. .................................. 242/444.1; 242/530.2
[58] Field of Search ........................... 242/444.1, 444.2, 242/444.3, 444, 445, 530.2

[56] References Cited

U.S. PATENT DOCUMENTS 4,709,472  12/1987  Machida et al. ....................... 242/444.1
4,975,095  12/1990  Strickland et al. .................... 242/444.1

FOREIGN PATENT DOCUMENTS

7014574  1/1995  Japan .

*Primary Examiner*—Katherine Matecki
*Attorney, Agent, or Firm*—Parkhurst & Wendel

[57] ABSTRACT

A winding mandrel holds a central portion of a belt-like electrode assembly extending flatly and rotates to form a spiral roll of the belt-like electrode assembly around this winding mandrel. The belt-like electrode assembly includes a first region extending in one direction from the central portion and a second region extending in the opposite direction from the central portion. A first attracting device is disposed at one side of the winding mandrel for attracting the first region of the belt-like electrode assembly. A second attracting device is disposed at the opposite side of the winding mandrel for attracting the second region of the belt-like electrode assembly. A first feeding means is associated with the first attracting means for shifting the first region of the belt-like electrode assembly toward the winding mandrel while adjusting a tension applied to the first region of the belt-like electrode assembly in accordance with a winding speed of the belt-like electrode assembly wound around the winding mandrel. And, a second feeding means is associated with the second attracting means for shifting the second region of the belt-like electrode assembly toward the winding mandrel while adjusting a tension applied to the second region of the belt-like electrode assembly in accordance with the winding speed of the belt-like electrode assembly wound around the winding mandrel.

8 Claims, 9 Drawing Sheets

SPIRAL ELECTRODE ASSEMBLY MANUFACTURING APPARATUS

BACKGROUND OF THE INVENTION

1. Field of the Invention

The present invention relates to a manufacturing apparatus for a spiral electrode assembly which is preferably incorporated in a battery, and more particularly to a winding apparatus for spirally winding a belt-like electrode assembly comprising a separator, a positive electrode sheet and a negative electrode sheet.

2. Prior Art

To realize high performances and multiple functions of cameras or other electronic devices, the batteries used for them as electrical power sources are required to be durable against high voltage and large enough in their capacities. To satisfy these requirements, a spiral electrode assembly consisting of a positive electrode sheet, a negative electrode sheet and a separator is widely used. Improving the safety and reliability of batteries, as well as the productivity, is a very important subject to be realized. In this respect, accuracy in the manufacturing of each spiral electrode assembly becomes a key point to realize an ideal product free from winding dislocation.

Unexamined Japanese Patent Application No. HEI 7-14574, published in 1995, discloses a method of preventing the winding dislocation in the manufacturing of spiral electrode assemblies to be incorporated in cylindrical batteries. Hereinafter, this conventional method will be explained with reference to FIGS. 10 and 11.

Figure 11:
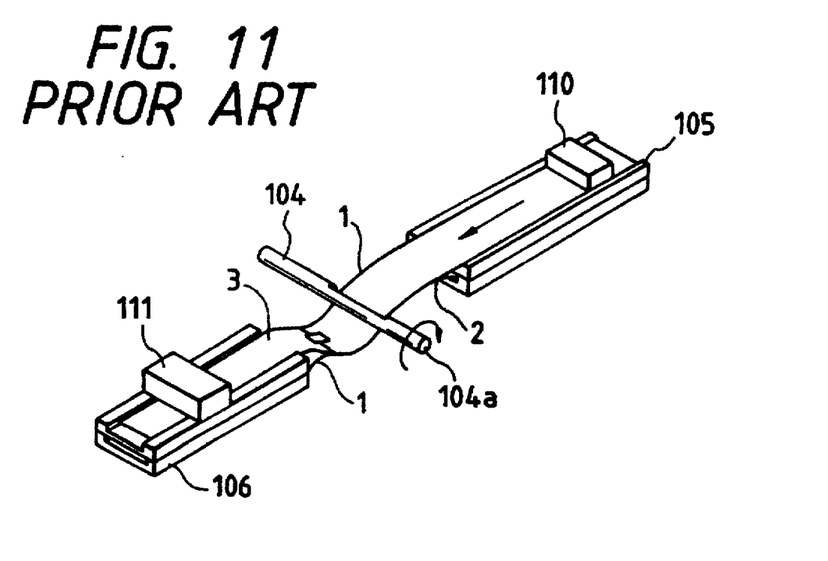
FIG. 11 is a perspective view showing the overall arrangement of a conventional spiral electrode manufacturing apparatus.

A pair of right and left guide blocks 105 and 106 are provided at opposite sides of a winding mandrel 104. Each of right and left guide blocks 105 and 106 has a two-decker structure having guide grooves equivalent to the widths of separator 1, positive electrode sheet 2 and negative electrode sheet 3.

Separator 1 and positive electrode sheet 2 are installed or disposed along upper and lower guide grooves of right guide block 105. Negative electrode sheet 3 and separator 1 are installed or disposed along upper and lower guide grooves of left guide block 106. A weight 110, placed on separator 1, is engageable with the upper guide groove of right guide block 105 and slidable in the longitudinal direction thereof. A weight 111, placed on negative electrode sheet 3, is engageable with the upper guide groove of left guide block 106 and slidable in the longitudinal direction thereof. Leading ends of positive electrode sheet 2 and negative electrode sheet 3 are fixed to the predetermined positions of separator 1, respectively, by means of adhesive tapes etc.

The longitudinal center of separator 1 is held or sandwiched by a slit 104a of the winding mandrel 104. In response to the rotation of the winding mandrel 104, all of separator 1, positive electrode sheet 2 and negative electrode sheet 3 slide simultaneously toward the winding mandrel 104 along the guide grooves of right and left guide blocks 105 and 106. Thus, positive electrode sheet 2 and negative electrode sheet 3 are stacked or accumulated on opposite surfaces of separator 1. And, a spiral electrode assembly is finally obtained by winding or rolling this three-layer assembly about the winding mandrel 104.

Figure 10:
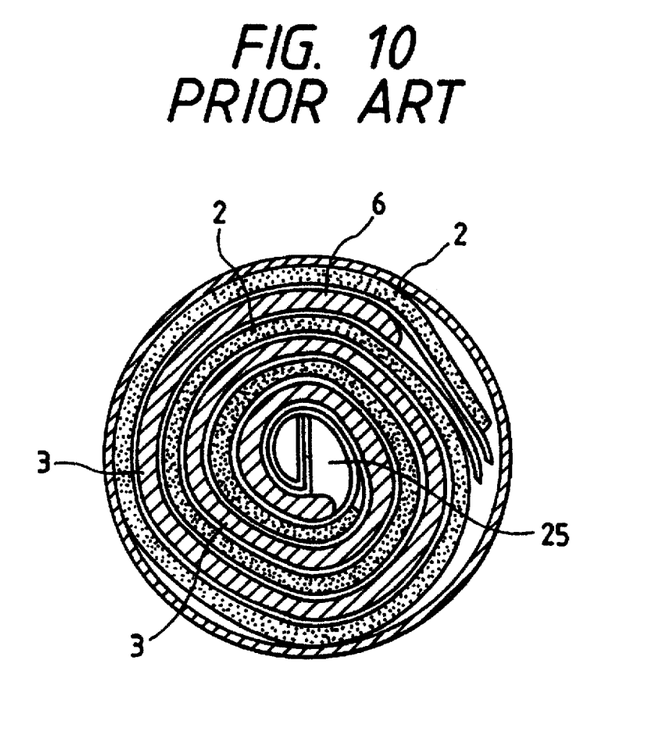
FIG. 10 is a cross-sectional view showing the configuration of a center hole of a conventional spiral electrode assembly.

FIG. 10 shows the configuration of a center hole formed at the center of the spiral electrode assembly which is formed by the winding apparatus shown in FIG. 11. As apparent from the drawing, the center hole configuration 25 of the spiral electrode assembly is separated into two semi-circular shapes by separator i which corresponds to the longitudinal center of separator 1 sandwiched or held by the slit 104a of winding mandrel 104. Similar center hole configuration is disclosed in Japanese Patent No. HEI 6-7494, published in 1994.

However, according to the above-described prior art, the following problems arise.

First, when the spiral electrode assembly is wound around the winding mandrel 104, there is the possibility that the separator 1, positive electrode sheet 2, and negative electrode sheet 3 may mutually cause dislocation in the axial direction of winding mandrel 104. The end surfaces of the spiral electrode assembly are not flattened in such a case. When the spiral electrode assembly having caused the cone-like winding dislocation is installed in a battery case, electrical short-circuit may be caused or the battery capacity will be possibly reduced.

Second, to ensure the performance and reliability of batteries, there is the necessity of accurately winding the spiral electrode assembly. To this end, it is preferable to apply a predetermined tension to the separator 1, positive electrode sheet 2 and negative electrode sheet 3 so that the configuration and size of the spiral electrode assembly can be stabilized.

According to the above-described prior art, the means for applying a tension to separator i is weight 110 and/or 111. These weights 110 and 111 are, however, insufficient to realize accurate adjustment of the tension applied to separator i and others. More specifically, when the separator i is wound by the winding mandrel 104, there is the possibility that the tension may be excessively applied to the separator 1 or, on the contrary, excessively reduced due to the absence of an appropriate means for positively feeding the separator 1, positive electrode sheet 2 and negative electrode sheet 3 toward the winding mandrel 104 in accordance with the winding speed. Thus, the separator 1, which is extremely thin, is expanded or shrunken. This deteriorates the reliability of batteries, and the productivity in the manufacturing of spiral electrode winding assemblies. In addition, the separator 1, positive electrode sheet 2 and negative electrode sheet 3 may be damaged by the friction when they slide along the guide grooves of guide blocks 105 and 106.

Third, the center hole configuration of the spiral electrode assembly is divided into two semi-circular shapes. This in inconvenient for facilitating the succeeding manufacturing processes. For example, in the succeeding manufacturing process, the current collectors extracted from positive electrode sheet 2 and/or negative electrode sheet 3 are welded to a closure plate or a battery casing. In such a case, insertion of the welding jig into the center hole of the spiral electrode assembly cannot be automated due to the presence of separator 1 extending across the center hole. According to the conventional methods, such operations have been done manually. This was a weak point in improving the productivity.

SUMMARY OF THE INVENTION

Accordingly, in view of above-described problems encountered in the prior art, a principal object of the present invention is to provide a spiral electrode assembly manufacturing apparatus capable of accurately winding the belt-like electrode assembly.

In order to accomplish this and other related objects, the present invention provides a spiral electrode assembly manufacturing apparatus comprising: a winding mandrel for holding a central portion of a belt-like electrode assembly extending flatly and rotating to form a spiral roll of the belt-like electrode assembly around the winding mandrel, the belt-like electrode assembly including a first region extending in one direction from the central portion and a second region extending in the opposite direction from the central portion; a first attracting means disposed at one side of the winding mandrel for attracting the first region of the belt-like electrode assembly; a second attracting means disposed at the opposite side of the winding mandrel for attracting the second region of the belt-like electrode assembly; a first feeding means associated with the first attracting means for shifting the first region of the belt-like electrode assembly toward the winding mandrel while adjusting a tension applied to the first region of the belt-like electrode assembly in accordance with a winding speed of the belt-like electrode assembly wound around the winding mandrel; and a second feeding means associated with the second attracting means for shifting the second region of the belt-like electrode assembly toward the winding mandrel while adjusting a tension applied to the second region of the belt-like electrode assembly in accordance with the winding speed of the belt-like electrode assembly wound around the winding mandrel.

According to the features of preferred embodiment of the present invention, it is preferable that the belt-like electrode assembly comprises a separator and a positive electrode sheet and a negative electrode sheet.

The winding mandrel, the first attracting means and the second attracting means are provided on a rotary table acting as transporting means for transporting a spiral electrode assembly.

More specifically, the rotary table includes a plurality of units, each comprising the winding mandrel, the first attracting means and the second attracting means.

At least one of the first attracting means and the second attracting means comprises an endless belt having a plurality of air holes and disposed along an outer peripheral surface thereof, and the feeding means associated with the one of the first attracting means and the second attracting means feeds an attracting surface of the endless belt toward the winding mandrel when the belt-like electrode is wound.

Alternatively, at least one of the first attracting means and the second attracting means comprises a block having a plurality of air holes, and the feeding means associated with the one of the first attracting means and the second attracting means shifts the block toward the winding mandrel when the belt-like electrode is wound, thereby feeding the first or second region of the belt-like electrode assembly toward the winding mandrel.

Still further, at least one of the first feeding means and the second feeding means comprises a cam and a motion conversion mechanism.

Yet further, the winding mandrel comprises a winding core and an auxiliary pin extending in parallel so that the central portion of the belt-like electrode assembly is held between the winding core and the auxiliary pin and, when the spiral roll of the belt-like electrode assembly is partly formed, the auxiliary pin is independently removed from the spiral roll.

BRIEF DESCRIPTION OF THE DRAWINGS

The above and other objects, features and advantages of the present invention will become more apparent from the following detailed description which is to be read in conjunction with the accompanying drawings, in which.

DETAILED DESCRIPTION OF THE PREFERRED EMBODIMENTS

Preferred embodiments of the present invention will be explained in greater detail hereinafter with reference to the accompanying drawings. Identical parts are denoted by the same reference numerals throughout the views.

Hereinafter, the preferred embodiments of the present invention will be explained in greater detail with reference to FIGS. 1 through 9.

Figure 1:
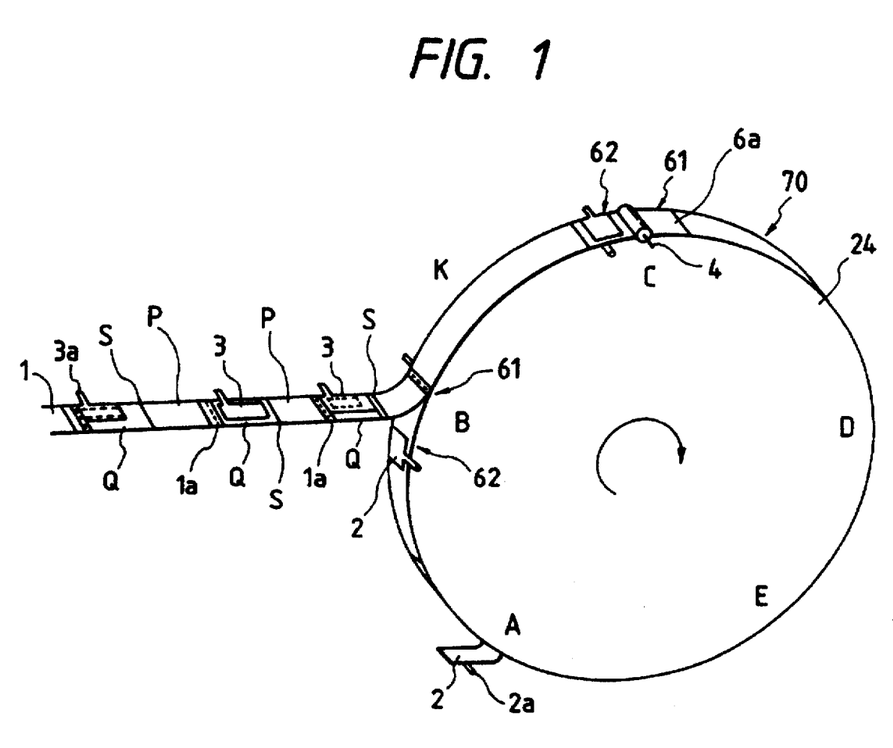
FIG. 1 is a perspective view showing the overall arrangement of a spiral electrode assembly manufacturing apparatus in accordance with the present invention.

FIG. 1 is a perspective view showing the overall arrangement of a spiral electrode assembly manufacturing apparatus 70 in accordance with the present invention. Hereinafter, the arrangement of this spiral electrode assembly will be explained.

A rotary table 24 comprises a total of five stations which are provided on the cylindrical peripheral surface of the rotary table 24 and equally spaced in the angular direction. Each station comprises a unit consisting of a first attracting device 61, a second attracting device 62 and a winding mandrel 4. The rotary table 24 rotates about its axis in the clockwise direction at a constant angular speed.

A separator 1 is continuously supplied to the rotary table 24. The separator 1 is divisible into a plurality of subsections along cutting lines 1a provided at regular intervals corresponding to the length of each spiral electrode assembly 6. A central portion S, provided at the midpoint between adjacent two cutting lines 1a, divides the subsection into first and second regions P and Q. First region P extends from central portion S to the forward cutting line 1a, while second region Q extends from central portion S to the rearward cutting line 1a.

A negative electrode sheet 3 adheres on the surface of each second region Q of separator 1 together with a current collector 3a by means of a glass tape. The first region P of separator 1 is attracted at the position B by first attracting device provided along the cylindrical peripheral surface of rotary table 24, and then transported in the clockwise direction in response to the rotation of rotary table 24. The second region Q of separator 1 and negative electrode sheet 3 are attracted at the position B by second attracting device 62 together with a positive electrode sheet 2 (later described), and then transported in the clockwise direction in response to the rotation of rotary table 24.

Pieces of positive electrode sheet 2, each having a current collector 2a, are successively supplied to the cylindrical peripheral surface of rotary table 24 at the position A, and attracted one after another by second attracting device 62 provided along the cylindrical peripheral surface of rotary table 24.

Positive electrode sheet 2, after being attracted or held at the position A, is transported to the position B where the positive electrode sheet 2 meets the second region Q of separator 1 on which negative electrode sheet 3 adheres and they are attracted together by second attracting device 62 provided at the position B.

The width of separator 1 is slightly wider than the width of positive electrode sheet 2 positioned on the lower surface of second region Q; therefore, second attracting device 62 can attract both of separator i and positive electrode sheet 2 at the same time. Thus, a three-layer construction consisting of separator 1, positive electrode sheet 2 and negative electrode sheet 3 is formed at the second region Q.

Thereafter, at the position K of rotary table 24, separator 1 is cut into a piece (i.e. belt-like electrode assembly 6a) having the length equivalent to a single spiral electrode assembly 6. Winding mandrel 4 holds the central portion S of separator 1 of belt-like electrode assembly 6a. The belt-like electrode assembly 6a, consisting of separator 1, positive electrode sheet 2 and negative electrode sheet 3, is wound or rolled in the region between position C to position D of rotary table 24, thereby forming the spiral electrode assembly 6.

When the spiral electrode assembly 6 is completely wound or rolled, the outermost layer of the spiral electrode assembly 6 is fixed by an outer tape 69 (refer to FIGS. 7A through 7D) at the position D of rotary table 24. Then, the spiral electrode assembly 6 is inserted into a transporting jig and transported to the next manufacturing station from the position E.

According to the embodiment of the present invention, the belt-like electrode assembly 6a is wound or rolled while the tension applied to separator 1 or others of the belt-like electrode assembly 6a is maintained at an optimum value.

Figure 2:
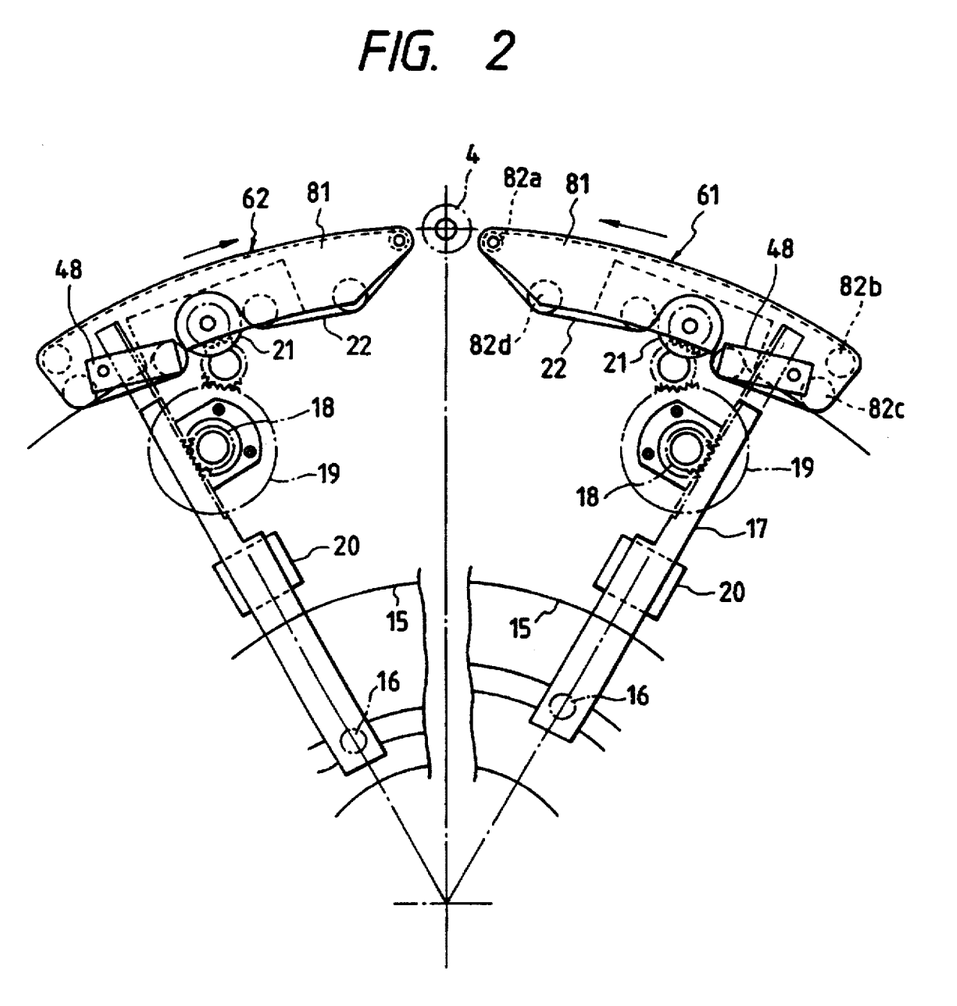
FIG. 2 is a detailed arrangement of a spiral electrode assembly manufacturing apparatus in accordance with a first embodiment of the present invention.

As described above, a unit consisting of first attracting device 61, second attracting device 62 and winding mandrel 4 is provided on each station of rotary table 24. FIG. 2 shows the detailed structure of first attracting device 61 and second attracting device 62 in accordance with the first embodiment. First attracting device 61 and second attracting device 62 are identical in their configuration and basically comprise an endless belt 22. Hereinafter, the arrangement of first attracting device 61 will be chiefly explained.

Figure 3:
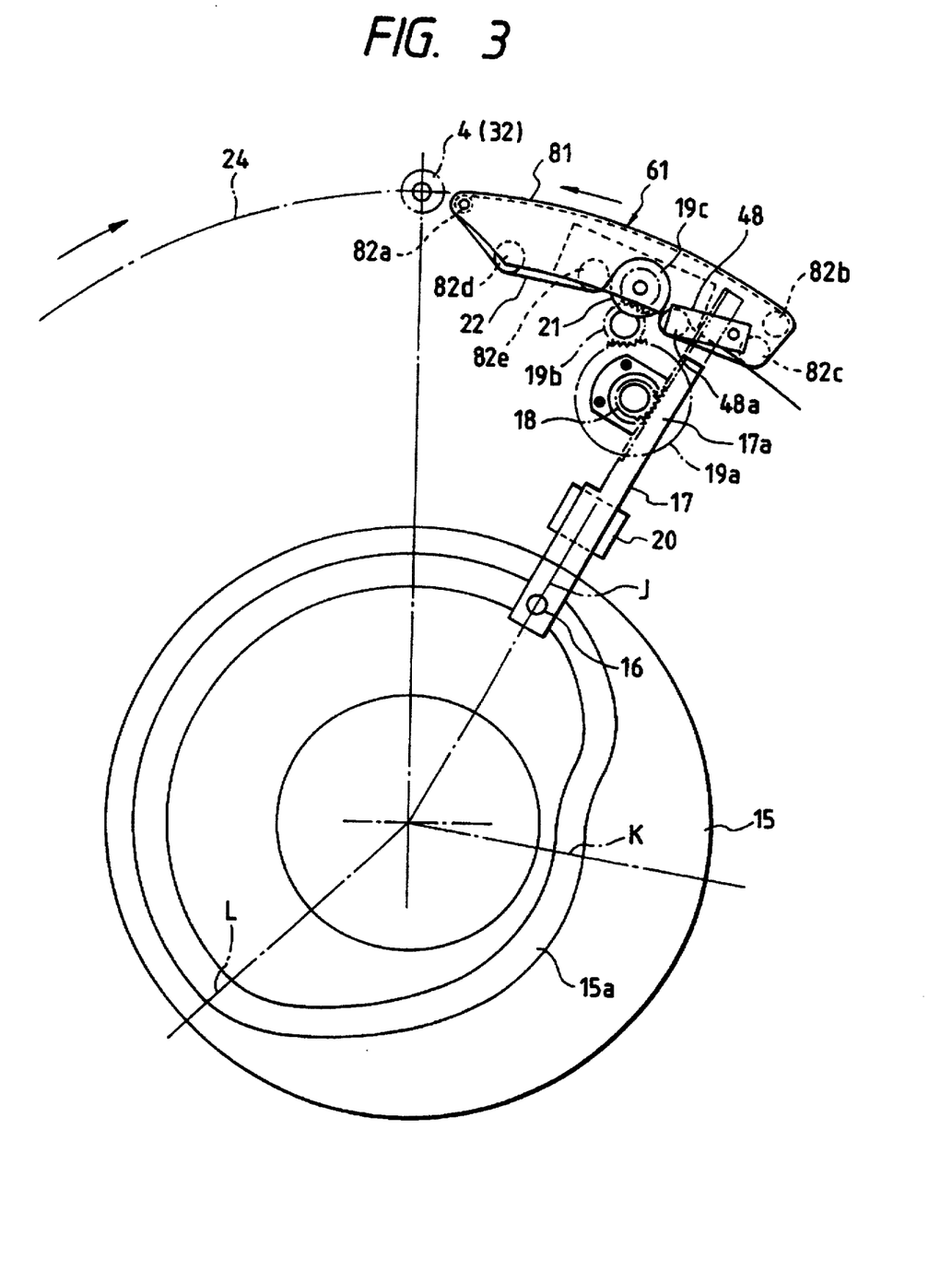
FIG. 3 is a cross-sectional view showing the relationship between an attracting device and a drive groove cam of the spiral electrode assembly manufacturing apparatus in accordance with the first embodiment of the present invention.
Figure 4:
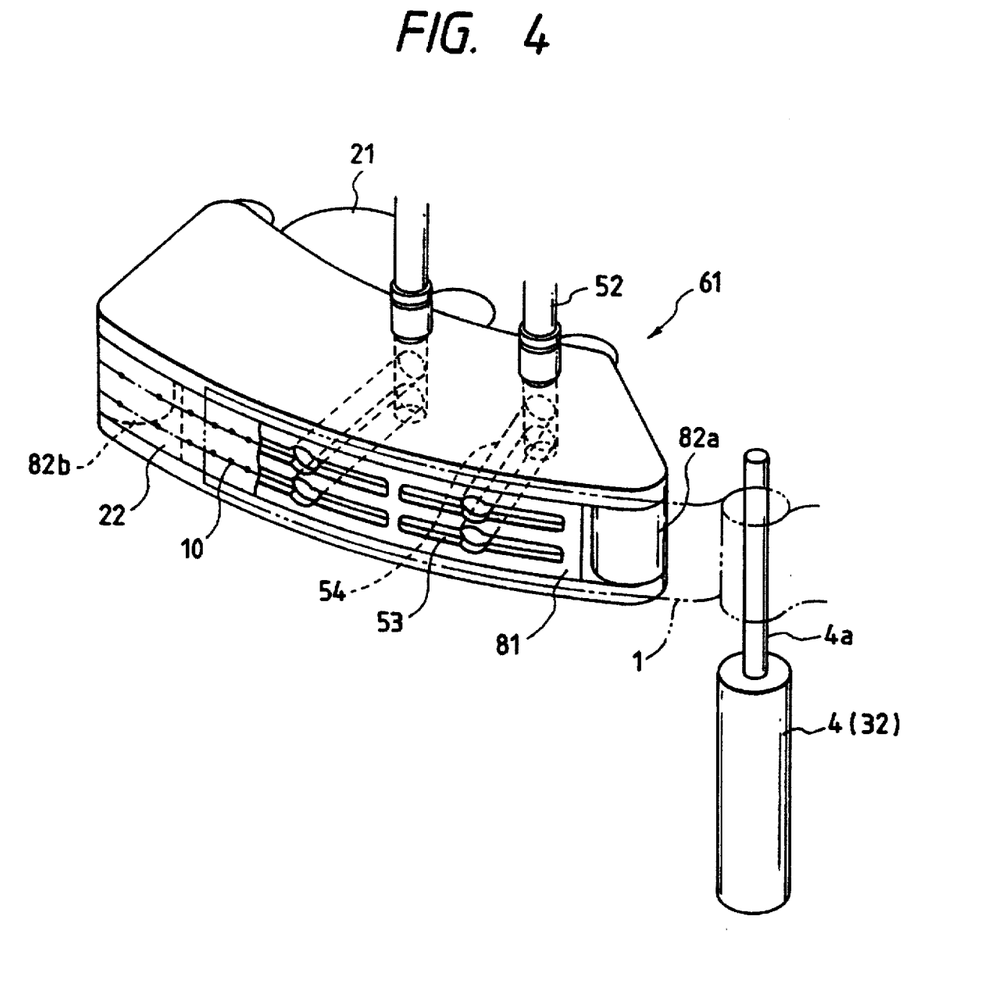
FIG. 4 is a perspective view showing the arrangement of the attracting device of the spiral electrode assembly manufacturing apparatus in accordance with the first embodiment of the present invention.

FIGS. 3 and 4 show the first attracting device 61. First attracting device 61 comprises an outer frame 81 having an arc-shaped outer periphery fitting the cylindrical peripheral surface of rotary table 24. This outer frame 81 is fixed to rotary table 24. A total of five rollers 82a, 82b, 82c, 82d and 82e are provided at different portions of the outer side surface of outer frame 81. The endless belt 22 is entrained along the outer periphery of outer frame 81 through these rollers 82a, 82b, 82c, 82d and 82e.

A rod 17, having a cam follower 16 at the radially inner end and a rack 17a extending from the center to the radially outer end, is disposed in the radial direction. The rod 17 is guided by a guide 20. A driving groove cam 15 is provided coaxially with rotary table 24 and stationarily fixed relative to the same. Cam follower 16 is engaged or coupled with a groove formed on driving groove cam 15. Thus, when rotary table 24 rotates, the rod 17 causes a reciprocative shift movement in a radial direction in accordance with the configuration of groove 15a. The rack 17a thus causes a reciprocative shift movement in synchronism with the shift movement of rod 17.

More specifically, when cam follower 16 arrives the groove position J, the rack 17a starts a radially inward shift movement which continues until cam follower 16 reaches the groove position K. Thereafter, the rack 17a gradually shifts in a radially outward direction when the cam follower 16 moves from groove position K to groove position L. Then, the rack 17a stops at the same radial position when the cam follower 16 moves from groove position L to the groove position J.

A pinion 18 with a built-in one-way clutch is meshed or engaged with rack 17a. Pinion 18 and a gear 19a are rotatable in response to the radially inward shift movement of rack 17a. The rotation of gear 19a is transmitted to a drive roller 21 through gears 19b, 19c meshing each other. Drive roller 21 is integrally fixed to gear 19c which is provided on the outer frame 81. Thus, drive roller 21 rotates in the clockwise direction. Drive roller 21 is brought into contact with the lower surface of endless belt 22. In other words, the endless belt 22 is shifted in the counterclockwise direction in response to the rotation of drive roller 21. Thus, endless belt 22 moves toward the winding mandrel 4 in the counterclockwise direction.

Thus, by adequately determining the configuration of groove 15a of drive groove cam 15, it becomes possible to adequately maintain the tension applied to separator 1 or others when the belt-like electrode assembly 6a is wound or rolled, without causing any crinkling. Accordingly, the manufacturing of the spiral electrode assembly 6 can be accurately performed.

The pinion 18 accommodates the one-way clutch. Accordingly, the pinion 18 does not transmit the rotation to gear 19a when the rack 17a is shifting in the radially outward direction. Endless belt does not rotate in the opposite direction. Thus, it becomes possible to prevent separator 1 or others from being subjected to an excessive tension during the winding or rolling operation of the belt-like electrode assembly 6a, without causing any damage of separator 1.

A lever 48, adjusting the tension of endless belt 22, is provided at the radially outward end of rod 17. A roller 48a, provided on the distal end lever 48, is pressed against the endless belt 22 to eliminate the looseness of endless belt Next, the arrangement for attracting separator i and others along the outer peripheral surface of first attracting device 61 will be explained with reference to FIG. 4. Numerous vacuum grooves 53 are formed on the outer peripheral surface of outer frame 81. A vacuum device 52 is connected to these vacuum grooves 53 to suck air from the vacuum grooves 53. Passages formed in the body of first attracting device 61, extend radially to connect the vacuum device 52 to respective vacuum grooves 53. Numerous air holes 10 are provided on the endless belt 22 so as to confront with vacuum grooves 53 when the endless belt 22 is disposed along the outer peripheral surface of outer frame 81. Thus, separator 1 and others can adhere on the surface of endless belt 22 by the attraction force given by first attracting device 61 through these air holes 10.

Attracting the belt-like electrode assembly 6a in this manner makes it possible to surely hold the belt-like electrode assembly 6a without using special guides or the like. Thus, the winding operation free from positional dislocation can be performed.

The winding operation of belt-like electrode assembly 6a is performed at one station of rotary table 24 which comprises first attracting device 61, second attracting device 62 and winding mandrel 4.

Positive electrode sheet 2 is attracted by second attracting device 62 at the position A. Keeping this condition, the station shifts to the station B. At the position B, the first region P of separator 1 is attracted by first attracting device 61 provided at the position preceding the second attracting device 62. Then, in accordance with the succeeding rotation of rotary table 24, the second region Q of separator 1 is attracted together with negative electrode sheet 3 by second attracting device 62. Thus, a three-layer structure consisting of separator 1, positive electrode sheet 2 and negative electrode sheet 3 is formed in the second region Q of separator 1.

When the belt-like electrode assembly 6a equivalent to one spiral electrode assembly 6 is completely attracted by first attracting device 61 and second attracting device 62, i.e. when the station is positioned at the position K, the rear end of separator 1 is cut off. Rotary table 24 further rotates and the station arrives at the station C. The winding mandrel 4, consisting of a winding core 4a and an auxiliary pin 5 extending in parallel, protrudes toward the central position S of separator 1. The central portion S is inserted and held between by winding core 4a and auxiliary pin 5.

The winding core 4a and auxiliary pin 5 simultaneously start winding the belt-like electrode assembly 6a. Then, at the time the belt-like electrode assembly 6a is wound by several turns (e.g. 1.8-2.0 turns), auxiliary pin 5 is independently pulled out from the rolled part of belt-like electrode assembly 6a. Thereafter, the belt-like electrode assembly 6a is wound by the winding cope 4a only. This winding operation is finished before the station reaches the position D. In this case, air gap caused by the insertion and removal of auxiliary pin 5 can be completely eliminated, because an adequate amount of tension is applied to the belt-like electrode assembly 6a so that such an air gap can be crushed or flattened during the succeeding winding operation of the belt-like electrode assembly 6a. Thus, no adverse effect is applied to the succeeding manufacturing processes or to the manufactured products (i.e. batteries). The processes at the positions D and E are performed as explained previously.

The arrangement the above-described winding mandrel 4 and its operation will be explained in mope detail with reference to FIGS. 7 and 8.

As shown in FIGS. 7A through 7D, winding mandrel 4 comprises winding cope 4a and auxiliary pin 5. Winding cope 4a has a plurality of grooves extending in the axial direction along the cylindrical surface thereof, like a reamer. Auxiliary pin 5, extending in parallel with the winding core 4a, has an arc cross section. The curvature of the inner surface of the auxiliary pin 5 (i.e. a surface facing to the winding core 4a) is substantially the same as that of the cylindrical outer surface of winding core 4a.

Figure 7A:
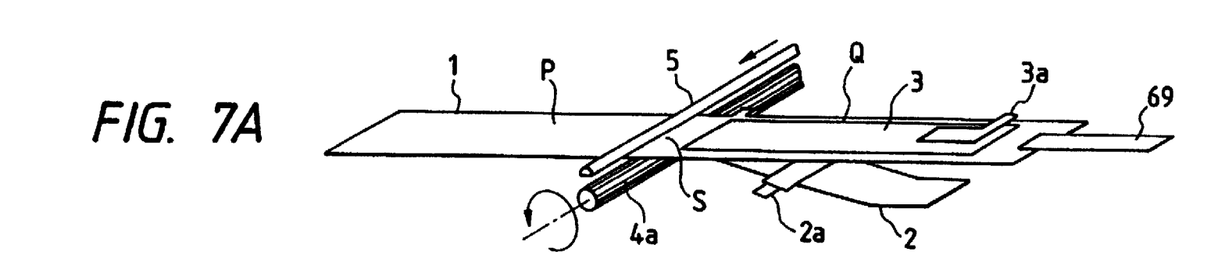
FIGS. 7A and 7D are perspective views illustrating the winding operation of a belt-like electrode assembly wound around a winding mandrel consisting of a winding core and an auxiliary pin in accordance with the present invention.
Figure 7B:
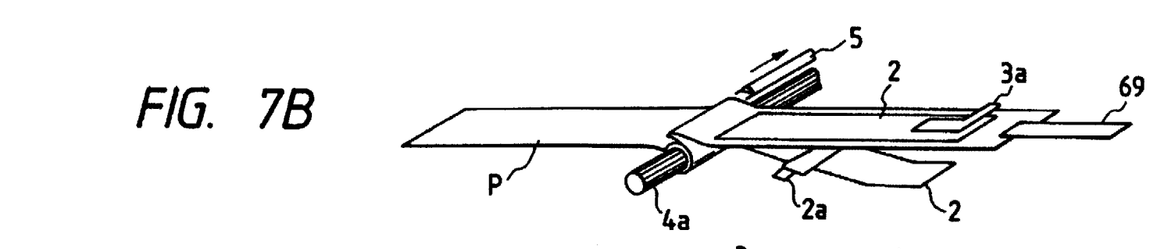

As shown in FIG. 7A, when the belt-like electrode assembly 6a is wound at the position C of rotary table 24, the winding mandrel 4 protrudes toward the center of belt-like electrode assembly 6a and the central portion S is held by winding core 4a and auxiliary pin 5. When the roll of the belt-like electrode assembly 6a is formed partly (by several turns), only the auxiliary pin 5 is pulled out from the rolled portion of belt-like electrode assembly 6a as shown in FIG. 7B.

Figure 7C:
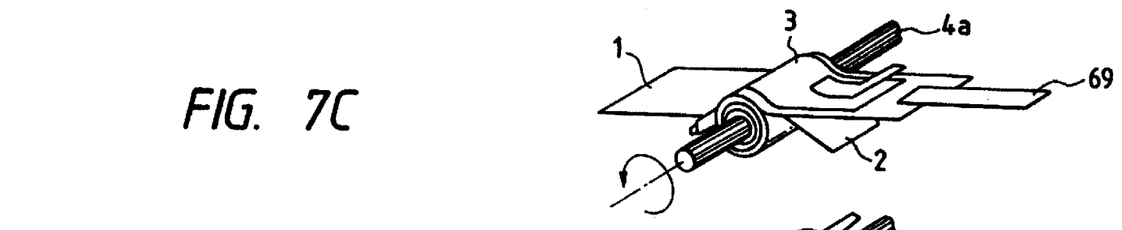

Thereafter, as shown in FIG. 7C, the belt-like electrode assembly 6a is completely wound by the winding core 4a only. As the belt-like electrode assembly 6a is surely wound or rolled under the tension maintained by the first attracting device 61 and second attracting device 62, the air gap caused due to the insertion and removal of auxiliary pin 5 can be completely crushed or flattened.

Figure 7D:
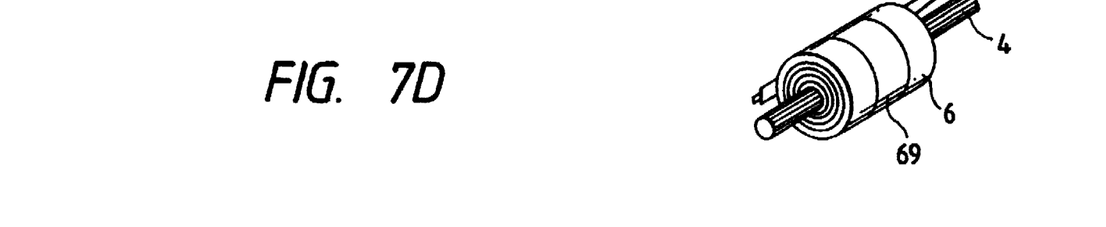

During the winding operation performed by winding core 4a only, the winding core 4a can surely hold the belt-like electrode assembly 6a without assistance of auxiliary pin 5, because of the presence of reamer-like grooves provided on the outer peripheral surface of winding core 4a. After finishing the winding operation, the terminal end of spiral electrode assembly 6 is fixed by the outer tape 69 as shown in FIG. 7D, thereby preventing the spiral electrode assembly 6 from loosing.

Figure 9:
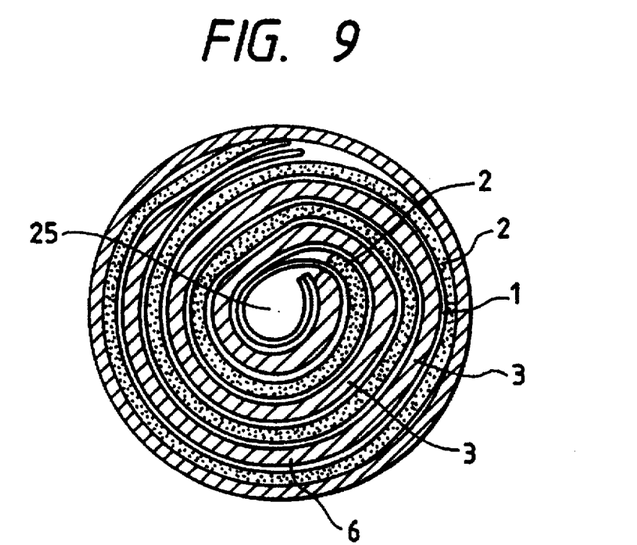
FIG. 9 is a cross-sectional view showing the configuration of a center hole of the spiral electrode assembly wound by the manufacturing apparatus of the present invention.

By using the winding core 4a chiefly for forming the spiral electrode assembly 6, the configuration of the center hole 25 becomes circular as shown in FIG. 9. This is advantageous in that a welding jig can be easily inserted in this center hole 25 in the succeeding manufacturing steps of batteries and, hence, the productivity in the manufacturing line can be greatly increased.

Figure 8:
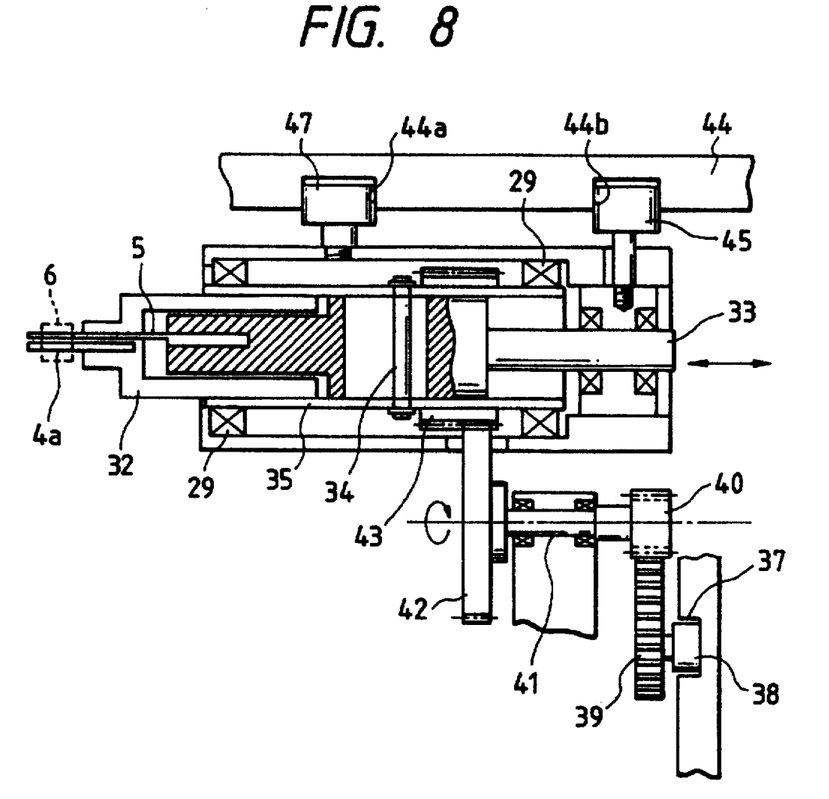
FIG. 8 is a cross-sectional view showing the detailed arrangement of the winding mandrel in accordance with the present invention.

FIG. 8 shows the cross-sectional view of winding mandrel 4. The driving operation of winding mandrel 4 is performed by cam follower 38 moving in a radial direction. Cam follower 38 is engaged with a groove cam 37 fixed behind the rotary table 24 coaxially with rotary table 24. The up-and-down motion of cam follower 38 is converted into the up-and-down motion of rack 39 integral with cam follower 38. The up-and-down motion of rack 39 is then converted into the rotational motion of a pinion 40 meshing with rack 39. The rotational motion is transmitted to a sleeve 35 via a rotation transmission shaft 41 and gears 42 and 43 mutually meshing. The winding core 4a fixed to the sleeve 35 rotates in accordance with the rotation of sleeve 35. The auxiliary pin 5 receives the rotational force of sleeve 35 A rotational force transmission pin 34 is connected to the sleeve 35. The rotational force of sleeve 35 is transmitted to the auxiliary pin 5 through this rotational force transmission pin 34. Furthermore, the rotation is transmitted to an auxiliary pin drive section 33 connected to the rotational force transmission pin 34, so as to rotate auxiliary pin 5. Then, the belt-like electrode assembly 6a is wound or rolled in accordance with the rotation of these winding core 4a and auxiliary pin 5.

Next, the rotary table 24 and a drum-like groove cam 44 are fixed coaxially. The drum-like groove cam 44 comprises grooves 44a and 44b. Cam followers 47 and 45 are engaged or coupled with these grooves 44a and 44b, respectively. Groove 44a and cam follower 47 are linked with sleeve 35. According to the configuration of groove 44a, the winding core 4a protrudes at the position C of rotary table 24 for winding the belt-like electrode assembly 6a and retracts at the position D, removing from the belt-like electrode assembly 6a after finishing the winding operation of spiral electrode assembly 6. Groove 44b and cam follower 45 are linked with auxiliary pin drive section 33. According to the configuration of groove 44b, the auxiliary pin 5 protrudes together with the winding cope 4a at the position C of rotary table 24 for winding the belt-like electrode assembly 6a and retracts when the roll of belt-like electrode assembly 6a is formed partly, removing from the belt-like electrode assembly 6a.

In FIG. 8, reference numeral 29 represents a bearing and reference numeral 32 represents a base housing supporting the winding cope 4a and the auxiliary pin 5.

Figure 5:
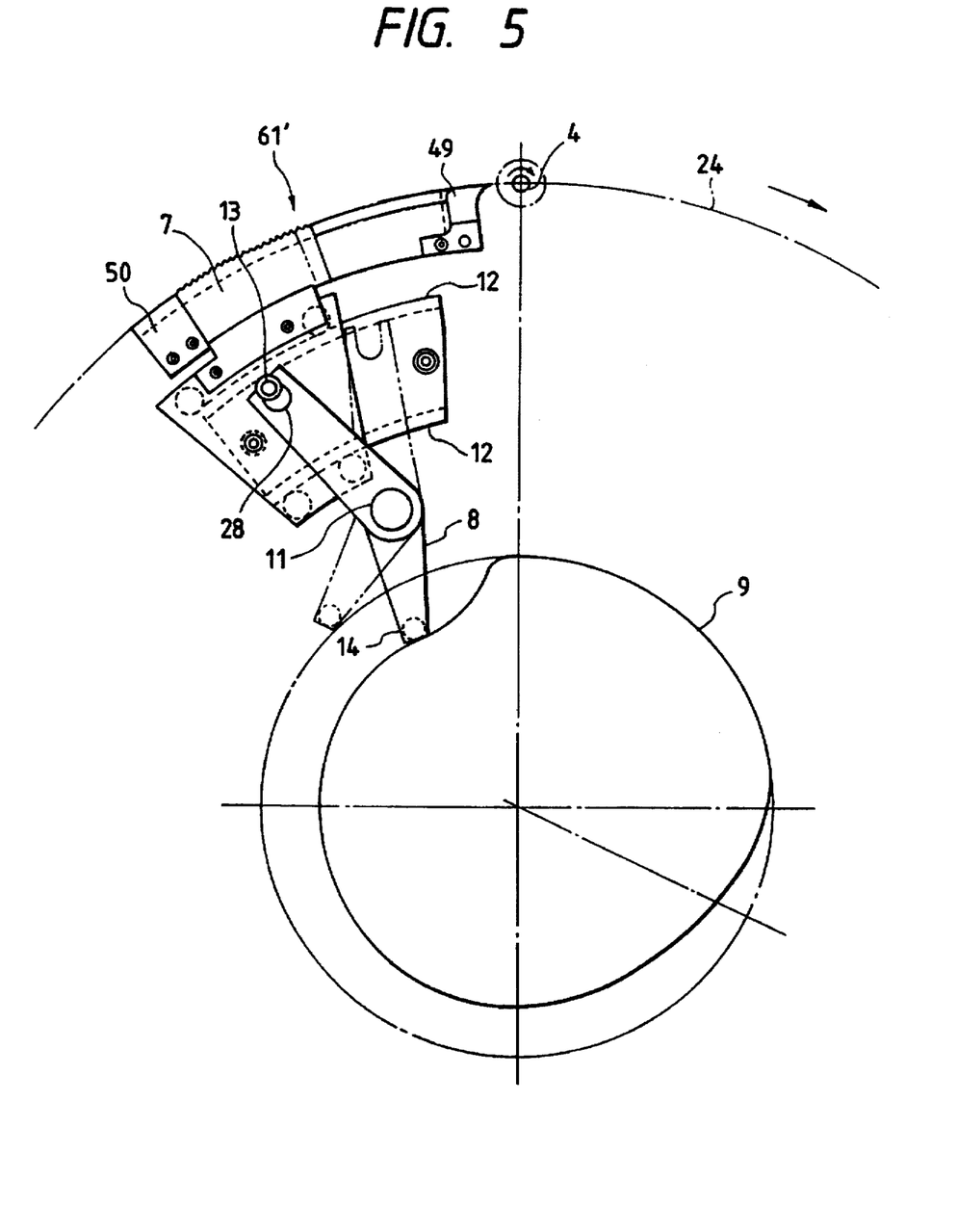
FIG. 5 is a cross-sectional view showing the arrangement of an attracting device of a spiral electrode assembly manufacturing apparatus in accordance with a second embodiment of the present invention.
Figure 6:
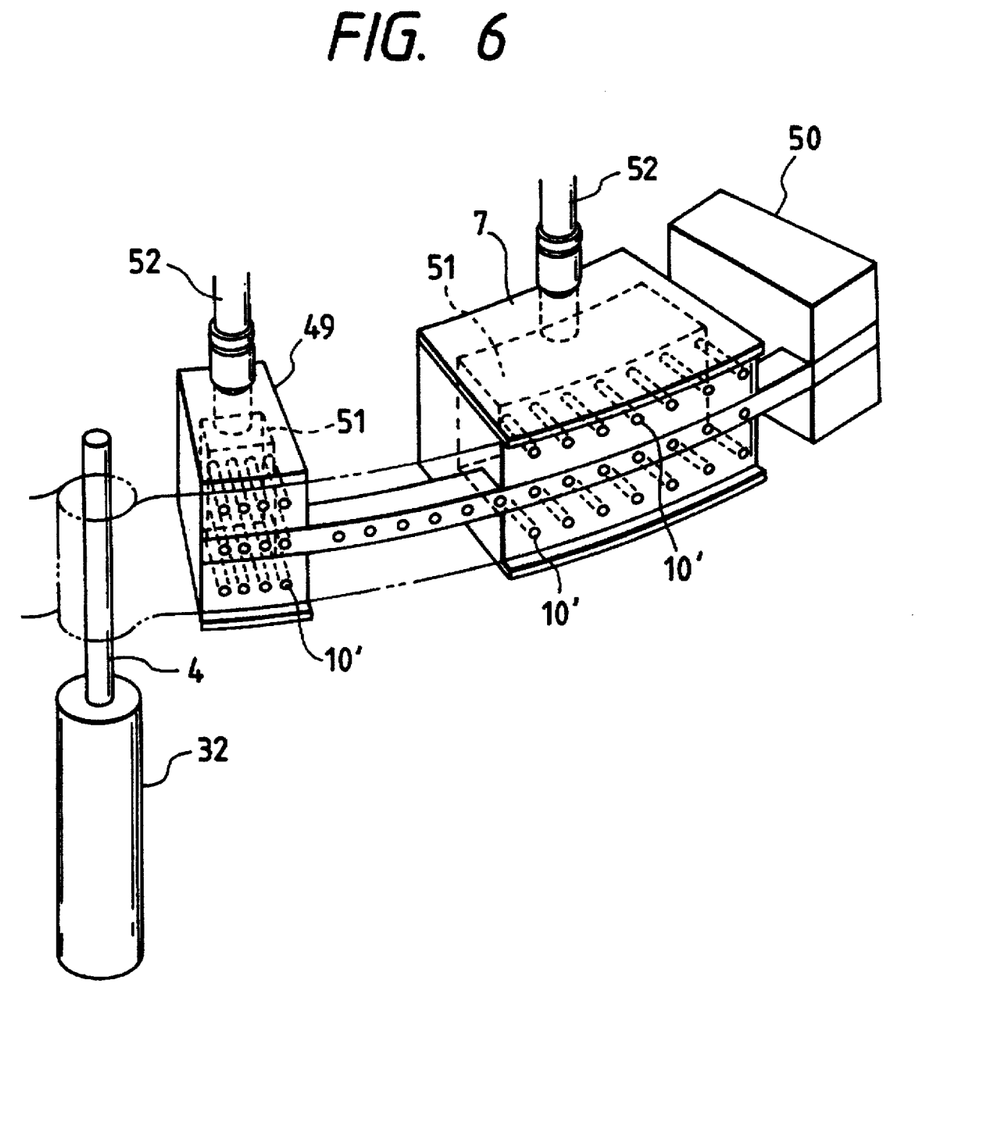
FIG. 6 is a perspective view showing the attracting device of the spiral electrode assembly manufacturing apparatus in accordance with the second embodiment of the present invention.

Next, a second embodiment of the present invention will be explained with reference to FIGS. 5 and 6. The second embodiment is different from the first embodiment in that the endless belt 22 is replaced by a movable block 7.

In this second embodiment, two attracting devices are identical in their construction. Hence, a first attracting device 61' will be chiefly explained hereinafter.

The block 7 provided in the first attracting device 61' is formed into an arc shape whose outer peripheral surface fitting to the outer peripheral surface of rotary table 24. A plurality of air holes 10' are formed on the outer peripheral surface of the block 7. Block 7 is slidable along guide rails 12.

A bent lever 8, rotatable about a support point 11, is provided on rotary table 24. U-shaped groove 28 is formed at the radially outermost end of the bent lever 8. A cam follower 14 is provided at the radially innermost end of the bent lever 8. A block drive cam 9 is coaxial with rotary table 24 and stationarily fixed to the central region of rotary table 24. The cam follower 14, moving along the outer periphery of block drive cam 9, drives the lever 8. Lever 8 causes a swing motion about the support point 11 in accordance with the cam profile of block drive cam 9.

When the rotary table 24 rotates in the clockwise direction, the lever 8 is swung in the same clockwise direction. Thus, the radially inward portion of lever 8 extending from the support point 11 moves left while the radially outward portion of lever 8 moves right in FIG. 5. This swing motion of lever 8 is transmitted to a pin 13 provided on the block 7 through an engagement between the pin 13 and the U-shaped groove 28 of lever 8. Thus, the block 7 shifts at a predetermined speed along the rails 12 toward the winding mandrel 4 in accordance with the cam drive motion, until the block 7 is stopped by a leading stopper 49.

After finishing the winding operation of the belt-like electrode assembly 6a, the block 7 shifts in the opposite direction in accordance with the cam profile of block drive cam 9 until the block 7 returns to the distal position where the block 7 is stopped by a trailing stopper 50.

According to the cam profile of block drive cam 9, the belt-like electrode assembly 6a is fed or sent at an optimum speed in accordance with the winding speed of winding mandrel 4. Hence, the tension applied to the belt-like electrode assembly 6a can be maintained at an optimum value during the winding operation of the belt-like electrode assembly 6a. Thus, it becomes possible to form the spiral electrode assembly 6 free from winding dislocation.

The method of attracting the belt-like electrode assembly 6a along the block 7 of first attracting device 61' is substantially the same as the attracting method of the first embodiment based on the first attracting device 61 and endless belt 22. Hence, the arrangement block 7 of first attracting device 61' will be simply explained hereinafter with reference to FIG. 6.

A plurality of air holes 10' are aligned in two rows on the outer side surface of block 7. These air holes 10' are connected to a vacuum chamber 51 provided inside the block 7. The vacuum chamber 51 is connected to a vacuum device (not shown) vie a vacuum pipe 52. With this arrangement, the belt-like electrode assembly 6a can adhere on the outer side surface of block 7 by the attraction (vacuum) force applied through air holes 10'.

By attracting the belt-like electrode assembly 6a in this manner, the belt-like electrode assembly 6a can be adequately wound or rolled without causing any dislocation.

According to this embodiment, the leading stopper 49 comprises air holes 10', vacuum chamber 51 and vacuum pipe 52 in the same manner as the block 7, so that the belt-like electrode assembly 6a can be attracted at the region of the leading stopper 49.

According to this embodiment, it is possible to divide the vacuum chamber 51 into a plurality of sub-chambers so that the degree of vacuum or attracting timing in each sub-chamber can be controlled in accordance with the winding speed of winding mandrel 4. Such a modification can be also applied to the first embodiment.

Furthermore, as a third embodiment of the present invention, it will be possible to combine the first embodiment and the second embodiment.

Still further, it is possible to replace the cam drive mechanism for the endless belt 22 or block 7 by an appropriate motor drive.

Yet further, when a 15-turn lithium battery (having the winding number of about 15) is manufactured in accordance with the first embodiment of the present invention, the spiral electrode assembly manufacturing device 70 of the present invention can produce approximately 60 batteries per minute. Regarding the winding dislocation of the spiral electrode assembly 6, the degree of flatness at both ends of the spiral electrode assembly 6 can be suppressed within the range of 0.5 mm.

According to the present invention, when the belt-like electrode assembly is wound or rolled around the winding mandrel, the first and second attracting devices cooperatively hold the belt-like electrode assembly. And, the present invention provides the feeding means to smoothly shift the belt-like electrode assembly toward the winding mandrel in accordance with the winding speed, without special guides. The belt-like electrode assembly can be wound without causing any dislocation. The tension applied to the belt-like electrode assembly can be maintained at an optimum value. Thus, it becomes possible to eliminate the defects of the spiral electrode assembly.

Furthermore, according to the present invention, the rotary-table type transportation means is provided, and a plurality of units, each consisting of the winding mandrel, the first attracting device and the second attracting device, are provided along the cylindrical peripheral surface. Accordingly, the manufacturing of the spiral electrode assembly can be performed continuously and effectively, improving the reliability of the product using the spiral electrode assembly.

Still further, the feeding means is constituted by the cam and the motion conversion means. Using this motion conversion means for driving the endless belt or the block makes it possible to omit the special positioning control, feeding speed control and others, thereby simplifying the arrangement of the apparatus.

Yet further, the winding mandrel is constituted by the winding core and the auxiliary pin. When the belt-like electrode assembly is partly wound by several turns, the auxiliary pin is pulled out from the rolled part of the belt-like electrode assembly. Then, a circular center hole remains at the center of the spiral electrode assembly after finishing the winding operation. This is advantageous when the jig is inserted into this center hole in the succeeding manufacturing process. Thus, the productivity in the manufacturing of batteries can be greatly increased.

As this invention may be embodied in several forms without departing from the spirit of essential characteristics thereof, the present embodiments described are therefore intended to be only illustrative and not restrictive, since the scope of the invention is defined by the appended claims rather than by the description preceding them, and all changes that fall within the metes and bounds of the claims, or equivalents of such metes and bounds, are therefore intended to be embraced by the claims.

What is claimed is:

1. A spiral electrode assembly manufacturing apparatus comprising:

a winding mandrel for holding a central portion of a belt-like electrode assembly extending flatly and for rotating to form a spiral roll of said belt-like electrode assembly around said winding mandrel, said belt-like electrode assembly including a first region extending in one direction from said central portion and a second region extending in the opposite direction from said central portion;

a first attracting means disposed at one side of said winding mandrel for attracting the first region of said belt-like electrode assembly;

a second attracting means disposed at the opposite side of said winding mandrel for attracting the second region of said belt-like electrode assembly;

a first feeding means associated with said first attracting means for shifting said first region of said belt-like electrode assembly toward said winding mandrel while adjusting a tension applied to said first region of said belt-like electrode assembly in accordance with a winding speed of said belt-like electrode assembly wound around said winding mandrel; and a second feeding means associated with said second attracting means for shifting said second region of said belt-like electrode assembly toward said winding mandrel while adjusting a tension applied to said second region of said belt-like electrode assembly in accordance with the winding speed of said belt-like electrode assembly wound around said winding mandrel.

2. The spiral electrode assembly manufacturing apparatus in accordance with claim 1, wherein said belt-like electrode assembly comprises a separator and a positive electrode sheet and a negative electrode sheet.

3. The spiral electrode assembly manufacturing apparatus in accordance with claim 1, wherein said winding mandrel, said first attracting means and said second attracting means are provided on a rotary table acting as transporting means for transporting a spiral electrode assembly.

4. The spiral electrode assembly manufacturing apparatus in accordance with claim 3, wherein said rotary table includes a plurality of units, each comprising said winding mandrel, said first attracting means and said second attracting means.

5. The spiral electrode assembly manufacturing apparatus in accordance with claim 1, wherein at least one of said first attracting means and said second attracting means comprises an endless belt having a plurality of air holes and disposed along an outer peripheral surface thereof, and the feeding means associated with said one of said first attracting means and said second attracting means feeds an attracting surface of said endless belt toward said winding mandrel when said belt-like electrode is wound.

6. The spiral electrode assembly manufacturing apparatus in accordance with claim 1, wherein at least one of said first attracting means and said second attracting means comprises a block having a plurality of air holes, and the feeding means associated with said one of said first attracting means and said second attracting means shifts said block toward said winding mandrel when said belt-like electrode is wound, thereby feeding said first or second region of said belt-like electrode assembly toward said winding mandrel.

7. The spiral electrode assembly manufacturing apparatus in accordance with claim 1, wherein at least one of said first feeding means and said second feeding means comprises a cam and a motion conversion mechanism.

8. The spiral electrode assembly manufacturing apparatus in accordance with claim 1, wherein said winding mandrel comprises a winding core and an auxiliary pin extending in parallel so that the central portion of said belt-like electrode assembly is held between said winding core and the auxiliary pin and, when the spiral roll of said belt-like electrode assembly is partly formed, said auxiliary pin is independently removed from said spiral roll.

* * * * *